(12) United States Patent
Ortalano

(10) Patent No.: US 9,617,409 B2
(45) Date of Patent: Apr. 11, 2017

(54) METHODS OF SOLUBILIZING MILLING MEDIA IN PIGMENT PARTICLE DISPERSIONS

(75) Inventor: Mark Ortalano, Cincinnati, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 67 days.

(21) Appl. No.: 13/992,071

(22) PCT Filed: Dec. 13, 2011

(86) PCT No.: PCT/US2011/064651
§ 371 (c)(1),
(2), (4) Date: Jun. 6, 2013

(87) PCT Pub. No.: WO2012/082741
PCT Pub. Date: Jun. 21, 2012

(65) Prior Publication Data
US 2013/0289137 A1  Oct. 31, 2013

Related U.S. Application Data

(60) Provisional application No. 61/422,368, filed on Dec. 13, 2010.

(51) Int. Cl.
| | |
|---|---|
| C09D 11/30 | (2014.01) |
| C08L 33/04 | (2006.01) |
| C09C 3/04 | (2006.01) |
| C08L 79/08 | (2006.01) |
| C09D 11/102 | (2014.01) |
| C09D 11/107 | (2014.01) |
| C09D 133/04 | (2006.01) |
| C09D 179/08 | (2006.01) |
| A61K 8/00 | (2006.01) |

(52) U.S. Cl.
CPC ............... *C08L 33/04* (2013.01); *C08L 79/08* (2013.01); *C09C 3/041* (2013.01); *C09D 11/102* (2013.01); *C09D 11/107* (2013.01); *C09D 11/30* (2013.01); *C09D 133/04* (2013.01); *C09D 179/08* (2013.01)

(58) Field of Classification Search
None
See application file for complete search history.

(56) References Cited

U.S. PATENT DOCUMENTS

| | | | |
|---|---|---|---|
| 3,586,247 A | 6/1971 | Perrins | |
| 4,036,652 A | 7/1977 | Rothmayer | |
| 4,652,313 A | 3/1987 | Den Boer et al. | |
| 5,290,352 A | 3/1994 | Krockert et al. | |
| 5,500,331 A | 3/1996 | Czekai et al. | |
| 5,513,803 A | 5/1996 | Czekai et al. | |
| 5,629,367 A * | 5/1997 | Lofftus et al. | 524/88 |
| 5,662,279 A | 9/1997 | Czekai et al. | |
| 5,679,138 A | 10/1997 | Bishop et al. | |
| 6,210,474 B1 | 4/2001 | Romano, Jr. et al. | |
| 6,294,013 B1 * | 9/2001 | Ortlano | C09B 67/0063 106/402 |
| 7,115,692 B2 | 10/2006 | Mongoin et al. | |
| 7,441,717 B1 | 10/2008 | Majka et al. | |
| 7,789,333 B2 | 9/2010 | Zakheim et al. | |
| 7,828,234 B1 | 11/2010 | Hockmeyer et al. | |
| 2005/0014868 A1 | 1/2005 | Rasmusen et al. | |
| 2005/0234176 A1 | 10/2005 | Mongoin et al. | |
| 2008/0207811 A1 * | 8/2008 | Brust | C09D 11/40 524/401 |
| 2010/0111809 A1 | 5/2010 | Suau et al. | |

FOREIGN PATENT DOCUMENTS

| | | |
|---|---|---|
| CN | 1409747 A | 4/2003 |
| CN | 1477997 A | 2/2004 |
| CN | 1505557 A | 6/2004 |
| CN | 1203133 C | 5/2005 |
| CN | 1813002 | 8/2006 |
| CN | 101300311 A | 11/2008 |
| EP | 0753552 A1 | 1/1997 |
| EP | 0823464 | 2/1998 |
| EP | 1884543 | 2/2008 |
| EP | 1884543 A1 | 2/2008 |
| EP | 1892240 A1 | 2/2008 |
| EP | 1990095 A1 | 11/2008 |
| JP | H 08-183920 | 7/1996 |
| JP | H 08-319429 | 12/1996 |
| JP | 2000-144030 | 5/2000 |
| JP | 2001-139863 A | 5/2001 |
| JP | 2001-271008 | 10/2001 |
| JP | 2002-020656 A | 1/2002 |
| JP | 2002-194262 | 7/2002 |
| JP | 2003-226831 | 8/2003 |

(Continued)

OTHER PUBLICATIONS

Joncryl® 67 Technical Data sheet supplied by BASF. 2 pages. SpecialChem 2016.*
International Search Report dated Apr. 2, 2012 for Application No. PCT/US2011/064651.
Chinese Office Action, Notification of the First Office Action, dated May 8, 2014 for Application No. 201180067456.4.

(Continued)

*Primary Examiner* — Lakshmi Channavajjala
(74) *Attorney, Agent, or Firm* — Frost Brown Todd LLC

(57) ABSTRACT

The present invention describes methods for preparing a pigment particle dispersion. Specifically, a premix composition including pigments, dispersants and a liquid carrier is milled by a solid milling agent to predetermined particle size. The solid milling agent is solubilized in the liquid carrier which eliminates the need for separating the solid milling agent from the dispersion.

14 Claims, No Drawings

(56) References Cited

FOREIGN PATENT DOCUMENTS

| | | |
|---|---|---|
| JP | 2003-260347 A | 9/2003 |
| JP | 2008-069343 A | 3/2008 |
| JP | 2009-179789 A | 8/2009 |
| WO | WO 03/097753 | 11/2003 |
| WO | WO 2004/092285 | 10/2004 |
| WO | WO 2007/105466 | 9/2007 |

OTHER PUBLICATIONS

European Communicated dated Jun. 11, 2014 for Application No. 11 806 061.5.
Chinese Office Action dated Jan. 13, 2015 for Application No. CN 201180067456.4, 7pgs.
European Communication dated May 29, 2015 for Application No. EP 11 806 061.5, 4 pgs.
International Preliminary Report on Patentability and Written Opinion dated Jun. 18, 2013 for Application No. PCT/US2011/064651, 6 pgs.
Japanese Office Action dated Jan. 20, 2015 for Application No. JP 2013-544693, 5 pgs.
Japanese Office Action dated Nov. 10, 2015 for Application No. JP 2013-544693, 5 pgs.
Chinese Office Action dated Jul. 1, 2015 for Application No. 201180067456.4, 20 pgs.
Chinese Office Action dated Jan. 15, 2016 for Application No. 201180067456.4, 19 pgs.
Hamey, R., "Production of Organic Pigment Nanoparticles by Stirred Milling," MS Thesis, University of Florida, Aug. 2005, 66 pgs.

* cited by examiner

METHODS OF SOLUBILIZING MILLING MEDIA IN PIGMENT PARTICLE DISPERSIONS

The present application hereby claims the benefit of PCT/US2011/064651, filed on Dec. 13, 2011, which claimed benefit of the provisional patent application entitled "MILLING MEDIA RENDERED SOLUBLE AFTER COMPLETION OF DISPERSION," Ser. No. 61/422,368, filed on Dec. 13, 2010, the disclosure of which is hereby incorporated by reference in its entirety.

BACKGROUND OF THE INVENTION

Field of the Invention

The present invention describes methods for preparing a pigment particle dispersion utilizing a solid milling agent that is solubilized in the dispersion after a predetermined particle size is obtained. The present invention also describes methods for preparing a pigment particle dispersion eliminating the need for separating the solid milling agent from the dispersion after a predetermined particle size is obtained.

Description of the Related Art

The process of milling has been known and used for hundreds of years in a variety of applications including but not limited to printing arts, pharmaceuticals and foods. Milling typically involves repeated, random collisions of solid particles suspended in a slurry, or liquid dispersion, with milling media by way of impact, shear and cavitation forces over a predetermined period of time. By so doing, the particles break or de-aggregate into small, uniform particle sizes and/or particle size distributions.

Selecting an appropriate milling media type and shape depends upon the application and the desired particle size and/or particle size distribution of the dispersion. Typical milling media includes beads of ceramics, glasses, stainless steel, and solid polymeric resins. Polymeric media can be used to reduce or prevent contamination which may exist when using other types of milling media such as ceramic or metallic media.

The efficiency of reducing particle size and/or obtaining a predetermined particle size distribution of a dispersion also depends upon the size of the milling media. Smaller milling media ranging from about 0.2 mm to 0.65 mm can be used for more demanding applications requiring small particle sizes and higher quality dispersions such as in ink jet inks or high gloss packaging inks. Moreover, milling media less than about 0.1 mm can help reduce the mean particle size of a dispersion to less than 100 nm for a broad range of products, including but not limited to carbon black and organic pigments.

Conventionally, a re-circulating mill, such as those from Eiger, Drais or Netzsch, or discrete pass mills, such as those from Buhler, Premier or Dyno are, are used in the industry to perform milling. Once the predetermined particle size of the dispersion is obtained, milling is stopped. Generally, screens or gaps are employed to retain the milling media in the mill. Another approach is to mix milling media with a dispersion in a mixing tank and filter or separate the media from the dispersion after a predetermined particle size is obtained. The extra time required for filtration or separation reduces throughput. In addition, since all of the milling media cannot be separated from the dispersion during filtration or separation, the final product inevitably includes contaminants. This is especially relevant when ceramics or metals are employed as the milling media.

A need therefore exists in the art for an efficient milling process for producing a pigment particle dispersion of a predetermined particle size. Another needed exists for a less expensive process for producing a pigment particle dispersion of a predetermined particle size. Further, a need exists in the art for a pigment particle dispersion of a predetermined particle size that is substantially free of contamination.

SUMMARY OF THE INVENTION

An objective of the present invention is to provide an efficient milling process for producing a predetermined particle size and/or particle size distribution of pigment particle dispersion by increasing throughput.

Another objective of the present invention is to provide a less expensive milling process for producing a submicron particle size and/or particle size distribution of pigment particle dispersion.

Yet another objective of the present invention is to provide a method of producing a predetermined particle size and/or particle size distribution substantially free of contamination.

A further objective of the present invention is to provide a predetermined particle size and/or particle size distribution substantially free of contamination.

The present invention describes a novel method for preparing an in-situ, pigment dispersion of a predetermined particle size. A premix composition including one or more pigments, one or more dispersants and a liquid carrier is provided. The premix composition is milled in the presence of a solid milling agent to a predetermined particle size whereby the solid milling agent remains substantially insoluble in the liquid carrier. A further step includes solubilizing the solid milling agent in the liquid carrier.

In an exemplary embodiment, the solid milling agent is solubilized after obtaining a predetermined particle size of the premix composition. In yet another exemplary embodiment, the step of solubilizing the solid milling agent is carried out by neutralizing the solid milling agent via a pH adjustment. In an alternative, exemplary embodiment, the step of solubilizing the solid milling agent is carried out by adding one or more additional solvents to the premix composition to render the solid milling agent soluble in the liquid carrier component of the premix composition.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

DETAILED DESCRIPTION OF THE INVENTION

A. Definitions
B. Methods for preparing pigment particle dispersions
  1. Premix composition
    a. Particles
    b. Liquid carriers
    c. Dispersants
    d. Additional components
  2. Milling the premix composition in the presence of milling media
    a. Milling media
    b. Particle dispersion 3. Solubilizing the milling media
   a. pH adjustment
   b. Addition of one or more solvents
   c. pH adjustment and addition of one or more solvents
4. Exemplary methods
C. Examples

A. Definitions

The definitions of the technical and scientific terms provided herein encompass definitions intended at the time. These definitions are not meant to be restrictive, as there can be other aspects to the definitions that are not recited, such as those commonly understood by one of skill in the art to which the invention(s) belong. All patents, patent applications, published applications and publications, websites and other published materials referred to throughout the entire disclosure herein, unless noted otherwise, are incorporated by reference in their entirety. In the event that there are pluralities of definitions for terms herein, those in this section prevail. Where reference is made to a URL or other such identifier or address, it is understood that such identifiers can change and particular information on the internet can come and go, but equivalent information is known and can be readily accessed, such as by searching the internet and/or appropriate databases. Reference thereto evidences the availability and public dissemination of such information.

It is to be understood that both the foregoing general description and the following detailed description are exemplary and explanatory only and are not restrictive of the subject matter claimed. In this application, the use of the singular includes the plural unless specifically stated otherwise. In this application, the use of "or" means "and/or" unless stated otherwise. Furthermore, use of the term "including" as well as other forms, such as "includes," and "included" is not limiting.

As used herein, ranges and amounts can be expressed as "about" a particular value or range. "About" also includes the exact amount. Hence "about 10%" means "about 10%" and also "10%."

As used herein, "optional" or "optionally" means that the subsequently described event or circumstance does or does not occur, and that the description includes instances where the event or circumstance occurs and instances where it does not. For example, an optionally substituted group means that the group is un-substituted or is substituted.

As used herein, the singular forms "a," "an" and "the" include plural referents unless the context clearly dictates otherwise. Thus, for example, reference to a composition comprising "a solvent" includes compositions with one or a plurality of solvents.

As used herein, a "combination" refers to any association between two or more items. The association can be spatial or refer to the use of the two or more items for a common purpose.

As used herein, a "composition" refers to any mixture of two or more products or compounds (e.g., solvents, resins, additives, etc.). It can be a solution, a suspension, liquid, powder, a paste, aqueous or non-aqueous formulations or any combination thereof.

As used herein, "homogeneous" with reference to a composition means that the components are in the liquid phase as a mixture, including as a solution or suspension.

As used herein the terms "mill," "milling" or "milled" refer to processes for agitating, grinding, crushing, crumbling, compressing, rolling, or otherwise reducing the size of particles. Such milling can, for example, reduce pigment particles to a powder or small granules.

B. Methods for Preparing Pigment Particle Dispersions

Provided herein are methods for preparing in-situ pigment particle dispersions. The methods utilize solid milling agents, such as alkali-soluble, acid-soluble, or solvent-soluble polymeric resins, that can be solubilized in the dispersion after completion of the milling process (i.e., particle size reduction). Additionally, the methods provided herein eliminate the need for a separate step of separating or filtering the milling media from the dispersion once particle dispersion is completed. In particular, the methods provided herein can be used to prepare pigment particle dispersions. Due to these features, the methods are advantageous over existing prior art methods of preparing pigment particle dispersions that use insoluble milling agents requiring separation from the dispersion after milling.

In an exemplary embodiment, the method includes preparing a premix composition of one or more particles, one or more liquid carriers, one or more dispersants, and optionally, one or more additives; agitating the premix composition in the presence of a solid milling agent that is substantially insoluble in the liquid carrier; and solubilizing the solid milling agent in the liquid carrier after a predetermined particle size reduction is obtained.

In an exemplary embodiment, the method includes a solid milling agent, such as an alkali-soluble, acid-soluble, or solvent-soluble polymeric material, can be used as milling media in the presence of a premix composition of particles, dispersant, liquid carrier, and optionally, other additives. The solid milling agent does not substantially dissolve in the liquid carrier. The premix and solid milling agent are milled until sufficient particle size reduction has occurred. In a further exemplary embodiment, milling is carried out by agitation. Once the pigment particles of the premix are dispersed (i.e., particle size reduction is completed), the solid milling agent can become part of the pigment particle dispersion by changing the nature of the liquid carrier and solubilizing the solid milling agent. In an exemplary embodiment, the nature of the liquid carrier can be changed by pH adjustment, for example by the addition of a base or an acid. In another exemplary embodiment, the nature of the liquid carrier can be changed by adding one or more solvents, such as a solvent that is able to dissolve the milling agent. In yet another exemplary embodiment, the nature of the liquid carrier can be changed by pH adjustment in combination with adding one or more solvents. In the methods provided herein, the solubilized (dispersed) resin becomes a component of the pigment particle dispersion.

In an exemplary embodiment of the methods provided herein, the liquid carrier chosen for use in the premix composition does not substantially dissolve the solid milling agent. In an exemplary embodiment, the methods can be performed in an aqueous system. The aqueous system can be, for example, water. Alternatively, the aqueous system can be a mixture of water and a water-miscible solvent that does not substantially dissolve the solid milling agent. In an exemplary embodiment, the methods can be performed in an organic solvent-based system.

A description of the steps of the method and components of the method are provided in the subsections that follow.

1. Premix Composition

The methods provided herein include preparing a premix composition of one or more particles, one or more liquid carriers and one or more dispersants. In some embodiments the premix composition can include one or more additives.

a. Particles

The premix compositions used in the methods provided herein can include any particle that can be milled in a media mill, such as any crystalline or amorphous solid material. The particles to be milled can include, for example, pharmaceutical materials, foods, pigments, industrial coatings, and cosmetics. Generally, the compound is a solid that may be a single crystalline form, a mixture of crystalline forms, an amorphous solid, or a mixture of solids to be milled. The size of at least some of the components of the solid is generally larger than the size of very small particles produced in this invention, although the compound may contain a range of sizes including some very small particles that can form a dispersion in the liquid carrier (solvent). The particles can be organic solids, either crystalline or amorphous materials, or they may be inorganic solids as long as they can be reduced in size by the milling process. Organic solids can be single compounds or mixtures of compounds, enantiomers, optical isomers, racemic mixtures, diastereomers, structural isomers, blends, glasses, separate crystal forms of a single substance or can be comprised of a plurality of polymorphs, eutectic mixtures, or formulations of different compounds such as a pigmented colorant and a surface active substance. The particles can be, for example, a precipitated solid, a recrystallized solid, a partially milled solid such as a previously media-milled solid, a jet milled solid, a partially ground solid, a micronized solid, a pulverized solid, a ball milled solid, a triturated solid, a sublimed solid, a residue from an evaporation, a solid derived from a synthetic process, a solid derived from an extract such as an organic solvent extraction or supercritical fluid extraction from a mixture such as a reaction product, or plant or tissue extract. Generally, the solid is essentially water-insoluble or completely water-insoluble when water is the liquid carrier or solvent.

Examples of solid materials that can be milled according to the methods provided herein include solid colorants such as pigments for printing inks, such as for ink jet printing or conventional printing; colorants for plastics; high-transparency colorants for electronic display color filter arrays; solid photographic materials such as dyes; solid cosmetic ingredients; solid automotive coatings; solid architectural coatings; solid chemicals; solid metal powders; solid catalyst materials; solid support material for catalysts; solid stationary phase particles or support materials useful in analytical and preparative chromatography; solid toner materials such as black toner materials and colored toner materials that are useful in xerographic and printing applications including laser printing; and solid pharmaceutical agents including water-soluble, water-insoluble, essentially water-insoluble and poorly water-soluble therapeutic and diagnostic imaging agents, medicinally active agents, medicaments, plant and herbal extracts, drugs, pro-drugs, drug formulations, diagnostic imaging agents, and the like.

The pigments used in the methods provided herein can include any pigment. The pigment can be in the form of an organic or an inorganic pigment and can include specialty pigments. Examples of pigments include, but are not limited to, carbon black, phthalocyanines (for example, phthalocyanine blue and phthalocyanine green), quinacridones (such as quinacridone magenta), perylenes, perinones, diketopyrrolos, pyrroles, thioindigos, anthraquinones, indanthrones, anthrapyrimidines, flavanthrones, pyranthrones, anthanthrones, dioxazines, triarylcarboniums, and quinophthalones; dianisidine orange; dinitroaniline orange; carbazole violet; azo compounds (for example, azo reds and azo yellows); precipitated dyes and those pigments found in the Colour Index International, or any combination thereof. The methods provided herein may be used to disperse a single pigment or a combination of pigments or a combination that includes both pigments and dye-based materials.

In some embodiments one or more of the pigments can be phthalocyanine (PCN) blue. In some examples, a crystal modifier for PCN blue can be added to the premix composition. Crystal modifiers for PCN blue include, but are not limited to, alkylpyrrolidones, glycols, dibasic esters, and amines. In other examples, non-crystallizing and non-flocculating additives or synergists for PCN blue can be added to the premix compositions to improve the stability of the composition. Suitable additives include, but are not limited to, phthalimidomethylene phthalocyanines (Pc); naphthalimidomethylene Pc; salts of Pc sulfonic acids with primary, secondary, tertiary and quaternary amines or/and etheramines; sulfonamides of Pc with primary, secondary amines, diamines, polyamines, or etheramines, such as polyalkoxy CuPc sulfonamide; amides of Pc carboxylic acids; and linear and branched alkyl- or alkanol Pc. The premix compositions of the methods provided herein can include one or more crystal modifiers or one or more additives for PCN blue, or a combination thereof.

In the premix compositions used in the methods provided herein, the total amount of colorant as a percentage (%) by weight of the composition (wt %) can be, e.g., from or between about from 5% to 80%, such as 5% to 10%, 5% to 15%, 5% to 25%, 5% to 30%, 5% to 40%, 5% to 50%, 5% to 60%, 5% to 70%, 5% to 80%, 10% to 20%, 10% to 30%, 10% to 40%, 10% to 50%, 10% to 60%, 10% to 70%, 10% to 80%, 15% to 25%, 15% to 30%, 15% to 35%, 15% to 40%, 15% to 45%, 15% to 50%, 15% to 60%, 15% to 70%, 15% to 80%, 20% to 30%, 20% to 40%, 20% to 50%, 20% to 60%, 20% to 70%, 20% to 80%, 25% to 30%, 25% to 35%, 25% to 40%, 25% to 45%, 25% to 50%, 25% to 60%, 25% to 70%, 25% to 75%, 25% to 80%, 30% to 40%, 30% to 50%, 30% to 60%, 30% to 70%, 30% to 75%, 40% to 50%, 40% to 55%, 40% to 60%, 40% to 65%, 40% to 70%, 40% to 75%, 40% to 80%, 45% to 50%, 45% to 55%, 45% to 60%, 45% to 65%, 45% to 70%, 45% to 75%, 45% to 80%, 50% to 55%, 50% to 60%, 50% to 65%, 50% to 70%, 50% to 75%, 50% to 80%, 55% to 60%, 55% to 65%, 55% to 70%, 55% to 75%, 60% to 70% and 60% to 80%.

Generally, the compositions contain less than 80% (wt %) colorant. For example, the compositions provided herein contain at least or about at least 5%, 7%, 10%, 12%, 15%, 17%, 19%, 20%, 21%, 22%, 23%, 24%, 25%, 26%, 27%, 30%, 35%, 40%, 42%, 45%, 48%, 50%, 55%, 60%, 65%, 70%, 75%, but less than 80% total colorant.

b. Liquid Carrier

The premix compositions used in the methods provided herein include one or more liquid carriers or solvents. In the milling process, the liquid carrier is used initially to suspend the particle to be dispersed by milling or agitation. The liquid carrier is chosen based on one or more desirable properties, for example, the inability to substantially dissolve the milling media.

In the methods provided herein, the liquid carrier chosen for use in the premix composition does not substantially dissolve the solid milling agent. The methods provided herein can be performed in an aqueous system. The aqueous system can be, for example, water. Alternatively, the aqueous system can be a mixture of water and a water-miscible solvent that does not substantially dissolve the solid milling agent. This water-miscible solvent can be acetone. Alternatively, the water-miscible solvent can be acetonitrile. In another embodiment, the water-miscible solvent can be tetrahydrofuran. In a further embodiment, the water-miscible solvent is an alcohol. In yet a further embodiment, the water-miscible solvent ban be a mixture of acetone, acetonitrile, tetrahydrofuran, or alcohols.

The methods provided herein can be performed in an organic solvent-based system. The organic solvent-based system can be a solvent that does not substantially dissolve the solid milling agent. For example, the organic solvent-based system can be glycol ethers, glycol ether acetates, alkyl acetates, ketones, cyclohexanone, alcohols, aromatic hydrocarbons, aliphatic hydrocarbons, ethers, esters, or mixtures thereof. This organic solvent can be an alcohol. Alternatively, the organic solvent can be cyclohexanone. In yet a further embodiment, the organic solvent can be a mixture of glycol ethers, glycol ether acetates, alkyl acetates, ketones, cyclohexanone, alcohols, aromatic hydrocarbons, aliphatic hydrocarbons, ethers, or esters.

Suitable liquid carriers include water or non-aqueous solvents, such as aliphatic hydrocarbons, such as heptanes, hexanes and pentanes; cyclic hydrocarbons, such as cyclohexanone, and substituted cyclic hydrocarbons, such as ethylcyclohexane; ketones; ethers; esters; petroleum distillates, such as naphtha, petroleum ether and light aliphatic solvents; aromatic hydrocarbons and compounds, such as xylene and toluene; alkyl acetates, such as ethyl acetate, isopropyl acetate, butyl acetate, propylene glycol monomethyl ether acetate (PM acetate) and n-propyl acetate; glycols and glycol ethers, such as monopropylene glycol, dipropylene glycol, 1-ethoxy-2-propanol, 1-propoxy-propanol (PROPOSOL solvent P), propylene glycol n-propyl ether, n-butyl ether, diethylene glycol monobutyl ether, propylene glycol methyl ether and diacetone alcohol; glycol ether acetates; and alcohols, such as butyl alcohol, 3-methoxy-butanol, ethanol, propanol, isopropanol and n-propanol. In the premix compositions used in the methods provided herein, the liquid carrier can be a single liquid carrier or can be a mixture of one or more liquid carriers.

In some embodiments, when the milling media is solubilized in the final particle dispersion by pH adjustment, the liquid carrier can be water. In other embodiments, when the milling media is solubilized by pH adjustment, the liquid carrier can be a combination of liquid carriers, such as water and a water-miscible solvent that does not substantially dissolve the milling media. In an exemplary method, when the milling media is solubilized by pH adjustment, the liquid carrier is water.

In some embodiments, when the milling media is solubilized in the final particle dispersion by addition of one or more solvents, the liquid carrier in the premix composition can be an organic solvent. In other embodiments the liquid carrier can be a mixture of one or more liquid carriers. In an exemplary method, when the milling media is solubilized in the final particle dispersion by addition of one or more solvents, the liquid carrier in the premix composition can be an alcohol.

c. Dispersants

The premix compositions used in the methods provided herein include one or more dispersants. Dispersants are typically used to stabilize the pigment particles in the solvent or liquid carrier. Dispersants also are typically used to improve separation of particles and to prevent settling or clumping of the particles. The dispersant is chosen based upon one or more considerations, such as the solvent system and particle used in the premix composition.

Suitable dispersants include natural or synthetic dispersants, such as surfactants, resins, polymers, or mixtures thereof. The surfactants can include synthetic surfactants, such as anionic surfactants, nonionic surfactants, cationic surfactants and amphoteric surfactants, or natural surfactants. Anionic surfactants can include, but are not limited to, phosphate esters, carboxylic acids, sulfonates and sulfates. Nonionic surfactants can include, but are not limited to, acetylenics, alkyl phenol ethoxylates/propoxylates, EO/PO block copolymers, linear or branched alcohol ethoxylates and esters. Cationic surfactants can be chosen from among primary, secondary, tertiary and quaternary amines and imides. Suitable amphoteric surfactants can include, for example, derivatives of aliphatic secondary and tertiary amines; alkali metal, alkaline earth metal, ammonium or substituted ammonium salts of alkyl amphocarboxy glycinates and alkyl amphocarboxypropionates; alkyl amphodipropionates, alkyl amphodiacetates, alkyl amphoglycinates, and alkyl amphopropionates; alkyl iminopropionates, alkyl iminodipropionates, and alkyl amphopropylsulfonates. Natural surfactants can include, but are not limited to, lecithin, fatty acids, glucamides, glycerides and polysaccharides. Exemplary surfactants include octylphenolethoxylates and acetylenics, and those surfactants found in the McCutcheon's Directory of Surfactants and Emulsifiers.

For a resin or polymer to be effective in dispersing pigment, it must be rendered soluble in the solvent or liquid carrier. Resins or polymers used in the premix compositions of the methods provided herein can include resins or polymers having acid or base functionality that have been neutralized or dissolved so that it is rendered soluble in the solvent or liquid carrier used in the premix composition. For example, a resin or polymer with acid or base functionality can be neutralized and rendered soluble in water. The resins or polymers can include resins or polymers without acid or base functionality that are immediately soluble in the solvent or liquid carrier used in the premix composition. For example, a resin or polymer without acid or base functionality can be immediately soluble in an organic solvent.

Suitable resins or polymers can include those with acid functionality, such as acrylic acid, and can include, but are not limited to, acrylates, methacrylates, methylmethacrylates, styrene acrylates, styrene maleic anhydride and other copolymers known to those of skill in the art. Suitable resins or polymers can include cationic resins, such as imide-based resins and other cationic resins known to those of skill in the art. Resins or polymers that can be used in an organic solvent or carrier include, but are not limited to, acrylates, aldehydes, vinyl, ketones and epoxy.

In certain exemplary embodiments, the resin or polymer can be neutralized with a base, such as with ammonia; amines such as monoethylamine (MEA) and triethylamine (TEA); amino-2-methyl-1-propanol, such as AMP™ 95 (Dow); hydroxides, such as sodium hydroxide and potassium hydroxide; and any other base known to those of skill in the art. In other embodiments, the resin or polymer can be neutralized with acid, such as with lactic acid or acetic acid or any other acid known to those of skill in the art.

There also are many commercially available dispersants including, but not limited to, Rhodasurf® (Rhodia), Triton® (Dow), Soprophor® (Rhodia), Igepal® (Rhodia), EFKA® (Ciba), Solsperse® (Lubrizol), BYK® (BYK Chemie), Tegospers®, (Tego), Joncryl® (BASF), Neocryl® (DSM), Vancryl® (Cytec), Morcryl® (Dow) SMA® (Cray Valley)

and Acrysol® (Dow), Vinnol® (Wacker), and others that will be known to those of skill in the art.

In the premix compositions used in the methods provided herein, one or more than one dispersants can be used. One or more surfactants, resins or polymers, or a combination thereof can be used in the premix compositions used in the methods provided herein.

In the compositions provided herein, the total amount of dispersants as a percentage (%) by weight of the premix composition (wt %) can be, e.g., between from or between about from 1% to 25%, such as 1% to 5%, 1% to 10%, 1% to 15%, 1% to 20%, 1% to 25%, 5% to 10%, 5% to 15%, 5% to 20%, 5% to 25%, 10% to 15%, 10% to 20%, 10% to 25%, 15% to 20%, 15% to 25%, and 20% to 25%, by weight of the composition. Generally, the premix compositions contain less than 25 wt % dispersant. For example, the premix compositions used in the methods provided herein contain at least or about at least 1%, 3%, 5%, 7%, 10%, 12%, 15%, 17%, 19%, 20%, 21%, 22%, 23%, 24%, but less than 25% (wt %) total dispersant.

d. Additional Components

The premix compositions used in the methods provided herein optionally can include components such as any of biocides, defoamers, humectants, flow and leveling agents or combinations thereof. The additional components are chosen based on the properties of the premix composition and pigment particle dispersion, such solvent system and particle type.

Biocides are typically added to compositions such as inkjet ink composition to suppress the growth of microorganisms such as molds and fungi in inks Example of suitable biocides include, but are not limited to, sodium dehydroacetate, 2-phenoxyethanol, sodium benzoate, sodium pyridinethion-1-oxide, ethyl p-hydroxybenzoate and 1,2-benzisothiazolin-3-one and salts thereof. An exemplary commercially available biocide is PROXEL™ biocide (Arch Chemicals).

Defoamers can be added to the premix composition to prevent foaming of the composition during its preparation. Any suitable defoamer known to those of ordinary skill in the art can be used, preferably those that are miscible with the liquid. Suitable defoamers include, but are not limited to, silicone defoamers and acetylenic defoamers. In some embodiments the defoamer can contain dipropylene glycol and 2,5,8,11-tetramethyl-6-dodecene-5,8-diol. An exemplary commercially available defoamer is Surfynol DF-110D (Air Products).

Humectants can also be used and include, but are not limited to glycols, including propylene glycol, polypropylene glycol, ethylene glycol, polyethylene glycol, diethylene glycol, tetraethylene glycol; sorbitol, glycerine, triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; and mixtures and derivatives thereof.

2. Milling the Premix Composition in the Presence of Milling Media

In the methods provided herein, the particles in the premix composition are milled, preferably via agitation, in the presence of an insoluble solid milling media that is substantially insoluble in the liquid carrier. In the methods provided herein, the milling media can be selected such that it is rendered soluble in the solvent or liquid carrier of the premix composition once sufficient particle size reduction has occurred. The milling media can also be selected such that the pigment particle dispersion tolerates the presence of the dispersed resin. Polymeric resins, such as acid-functional styrene acrylics, are commonly used in dispersions and in printing inks They can provide value as dispersants and buffers to shock, and they allow for re-solubility in printing inks and for improved flow from anilox flexographic rollers.

a. Milling Media

The milling media can be a solid, non-crosslinked polymeric resin that is substantially insoluble in the liquid carrier chosen for use in the premix composition. The polymeric milling media used in the methods provided herein can be solubilized in the liquid carrier after particle size reduction is completed. The polymeric milling media can include functionality for neutralization if pH adjustment is the mechanism for solubilization. For example, the polymeric milling media can include acidic functionality or basic functionality. The polymeric milling media can include functional groups that render the milling media organic solvent-soluble if addition of one or more solvents is the mechanism for solubilization.

The polymeric milling media used in the methods provided herein is insoluble in the liquid carrier and can be solubilized after particle size reduction is completed. Suitable polymeric milling media that can be used in the methods provided herein include non-crosslinked resins, such as styrene-acrylate, imide, and vinyl chloride/vinyl acetate polymeric resins.

Exemplary solid polymeric resins that can be used in the methods provided herein include, but are not limited to acrylic resins, such as styrene-acrylic resins, phenoxy resins, ketone resins, aldehyde resins, epoxy resins, vinyl chloride resins, vinyl chloride/vinyl acetate resins, cellulose acetate resins (such as cellulose acetate butyrate), polyester resins, acrylates, methacrylates, styrene copolymers, polyacrylates such as polymethyl methylacrylate, polycarbonates, polyacetals, vinyl chloride polymers and copolymers, polyurethanes, polyamides, poly(tetrafluoroethylenes) and other fluoropolymers, high density polyethylenes, polypropylenes, cellulose ethers and esters such as cellulose acetate, polyhydroxymethacrylate, polyhydroxyethylacrylate, silicone containing polymers such as polysiloxanes, biodegradable polymers such as poly(lactides), poly(glycolids) copolymers of lactides and glycolide, polyanhydrides, poly(hydroxyethyl methacrylate), poly(imino carbonates), poly(N-acylhydroxyproline) esters, poly(N-palmitoyl hydroxyprolino)esters, ethylene-vinyl acetate copolymers, poly(orthoesters), poly(caprolactones), poly(phosphazenes), and any modified solid polymeric resin of the types listed above. These resins can be used alone or in combination of two or more.

The solid polymeric resin can be a resin functionalized with one or more acidic groups. Exemplary acidic functional groups include, but are not limited to carboxyl groups, phosphate groups, and other acidic groups known to those of skill in the art. In some embodiments the solid polymeric resin will have an acid value at or above 200, such as for example, at or above 215, 220, 225, 230, 240, 250, or higher. In other embodiments the solid polymeric resin will have an acid value at or above 100, such as for example, at or above 105, 110, 115, 125, 135, 145, 150, or higher.

The solid polymeric resin can be a resin functionalized with one or more basic groups. Exemplary basic functional groups include, but are not limited to amino groups, and other basic groups known to those of skill in the art.

In the methods provided herein, the ratio of milling media to pigment can range from 20:1 to 1:20 by volume. In some embodiments, the ratio of milling media to pigment is or is about 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, or 1:1 or less. In other embodiments, the ratio of pigment to milling media is or is about 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, or 1:1 or less.

An exemplary solid polymeric resins used in the methods provided herein includes, for example, a styrene-acrylate polymeric resin. There are also many commercially available styrene-acrylate polymeric resins, including, but not limited to Joncryl® HPD-96, 580, 586, 611, 633 674, 678, 682, and 690 from BASF.

Another exemplary solid polymeric resin that can be used in the methods provided herein includes, for example, a vinyl chloride/vinyl acetate polymeric resin. An exemplary commercially available vinyl chloride/vinyl acetate polymeric resin includes Vinnol H15/50 from Wacker.

An imide-based resin is an example of a solid polymeric resin that can be used in the methods provided herein. An exemplary commercially available imide-based polymeric resin includes SMA 10001 from Cray Valley.

The solution-grade resin beads are generally supplied in pellet form. The resin can be added to the premix composition as a pellet or the resin can be pulverized before using in the premix composition of the methods provided herein. The resin can be pulverized by any method known to those of skill in the art, such as hammer milling, agitating in the liquid carrier under shear conditions, or osterizing the pellets (i.e., grinding in an Oster blender). Osterizing can yield polymeric resin particles ranging in size from about 0.25 microns to 87.5 microns (Sympatec Laser Diffraction, performed with dry osterized material) with 90% ranging from about 0.35 microns to 6.38 microns.

b. Forming a Dispersion

In the methods provided herein, the premix composition and milling media are milled together. Milling can take place in a tank under high agitation with a blade, rotor stator or any other suitable mixing or milling apparatus. The milling apparatus can be a simple vessel with a high-speed mixer, or any conventional mill designs, including ball mill, stirred-ball mill, sand mill pebble mill, horizontal media mill, vertical media mill, airjet mill, a roller mill, an attritor mill, a vibratory mill, a planetary mill, or bead mill. The milling can also be practiced in conjunction with high speed dispersers such as a Cowles disperser, rotor-stator mixers, or other conventional mixers which can deliver high fluid velocity and high shear. Mixers can include, but are not limited to, Sawtooth blades, Cowle's blades, homogenizers, Silverson mixers, D-Blades, rotor stators or propellers.

In an exemplary embodiment, agitation can be performed until sufficient particle size reduction has occurred and a dispersion with of pre-determined particle size has formed. Mixing time typically ranges from at or about 5 minutes to at or about 40 hours, but other mixing times are possible depending on the particle type and quality parameters. Generally, the mixing time will be such that the desired particle size reduction has been achieved, such as, for example, submicron particle size. In the methods provided herein, the mixing time can range from about 1 hour to 20 hours.

3. Solubilizing the Milling Media

In an exemplary embodiment, the solid milling agent is solubilized in the liquid carrier after a predetermined particle size of the premix composition is obtained. Solubilization can be performed by changing the nature of the liquid carrier, such as by pH adjustment. Alternatively, solubilization can be performed by adding one or more solvents to the premix composition. Selection of the solubilizing technique is based upon the solubility characteristics of the polymeric milling media.

In the exemplary methods provided herein, the solid polymeric milling agent can be solubilized in the premix composition after particle size reduction has been completed and the pigment particles are dispersed in the composition. The solid polymeric milling agent can be chosen such that it is substantially insoluble in the liquid carrier present in the premix composition, but can be solubilized in the liquid carrier by changing the nature of the solvent system.

a. pH Adjustment

In some embodiments the nature of the solvent system can be changed by adjusting the pH of the solvent system. Adjusting the pH of the solvent system can neutralize the functional groups on the polymeric milling media, such as the acidic or basic groups, and impart solubility of the polymeric resin in the liquid carrier. The polymeric milling media becomes part of the dispersion. The pH of the solvent system can be adjusted by adding, for example, an acid or a base.

In certain embodiments, acid can be added to the composition. Acid can be added to the composition so that the pH of the composition is lowered. The pH can be lowered to a level that causes the polymeric resin to solubilize in the liquid carrier and become part of the pigment particle dispersion. Suitable acids that can be used to adjust the pH of the solvent system and impart solubility of the resin include, but are not limited to acetic acid, lactic acid, phosphoric acid, hydrochloric acid, nitric acid, perchloric acid, sulfuric acid, hydrofluoric acid, hydrobromic acid, hydroiodic acid, carbonic acid, permanganic acid, chromic acid, hydrocyanic acid, nitrous acid, sulfurous acid, and any acid known to those of skill in the art that can be used to adjust pH. In an exemplary embodiment, pH adjustment can be achieved by the addition of acetic acid.

Acid can be added when the polymeric milling media is, for example, an acid-soluble polymeric milling media. An exemplary acid-soluble polymeric milling media is a cationic polymeric resin, such as an imide-based polymeric resin.

In other embodiments, base can be added to the composition. Base can be added to the composition so that the pH of the composition is raised. The pH can be raised to a level that causes the polymeric resin to solubilize in the liquid carrier and become part of the pigment particle dispersion. Suitable bases that can be used to adjust the pH of the solvent system and impart solubility of the resin include, but are not limited to ammonia, caustic bases, monoethylamine (MEA), triethylamine (TEA), amino-2-methyl-1-propanol, sodium hydroxide (NaOH), potassium hydroxide (KOH), calcium hydroxide, fluorides, bromides, iodides, bicarbonates, acetates, permanganates, phosphates, chromates, cyanides, nitrites, sulfites, and any base known to those of skill in the art that can be used to adjust pH. In an exemplary embodiment, pH adjustment can be achieved by the addition of ammonia.

Base can be added when the polymeric milling media is, for example, an alkali-soluble polymeric milling media. An exemplary acid-soluble polymeric milling media is a anionic polymeric resin, such as a styrene-acrylate polymeric resin.

In the methods provided herein, pH adjustment can be achieved by adding the acid or base in a dilute solution, such as in a dilute aqueous solution. The acid or base can be added in a concentrated solution, such as in a concentrated aqueous solution. Resin solubility by pH adjustment can be effected by any method of acid or base addition known to those of skill in the art.

b. Addition of One or More Solvents

In some embodiments the nature of the solvent system can be changed by adding one or more solvents to the composition. The one or more solvents to be added can include solvents that are compatible (miscible) with the liquid carrier used in the premix composition and has sufficient solvency to dissolve the polymeric milling media. Addition of one or more solvents that the polymeric milling media is soluble in can impart solubility of the polymeric resin in the liquid carrier. The polymeric milling media therefore becomes part of the dispersion.

Suitable solvents that can be added to the composition to solubilized the polymeric milling media include water or non-aqueous solvents, such as aliphatic hydrocarbons, such as heptanes, hexanes and pentanes; cyclic hydrocarbons, such as cyclohexanone, and substituted cyclic hydrocarbons, such as ethylcyclohexane; ketones; ethers; esters; petroleum distillates, such as naphtha, petroleum ether and light aliphatic solvents; aromatic hydrocarbons and compounds, such as xylene and toluene; alkyl acetates, such as ethyl acetate, isopropyl acetate, butyl acetate, propylene glycol monomethyl ether acetate (PM acetate) and n-propyl acetate; glycols and glycol ethers, such as monopropylene glycol, dipropylene glycol, 1-ethoxy-2-propanol, 1-propoxy-propanol (PROPOSOL solvent P), propylene glycol n-propyl ether, n-butyl ether, diethylene glycol monobutyl ether, propylene glycol methyl ether and diacetone alcohol; glycol ether acetates; and alcohols, such as butyl alcohol, 3-methoxy-butanol, ethanol, propanol, isopropanol and n-propanol. In the methods provided herein, the additional solvent can be a single solvent or can be a mixture of one or more solvents.

The exemplary methods provided herein imparting solubility to the polymeric resin include addition of one or more solvents, such as a hydrocarbon, to the milled premix composition. For example cyclic hydrocarbons such as cyclohexane are added to a milled premix composition containing an alcohol liquid carrier such as 3-methoxybutanol.

c. pH Adjustment and Addition of One or More Solvents

In some embodiments the nature of the solvent system can be changed by a combination of pH adjustment in combination with adding one or more solvents to the milled premix composition. The pH adjustment and solvent addition can be performed according to any of the methods described above.

In some embodiments of the methods provided herein, the polymeric milling media cannot be solubilized in the composition by pH adjustment or solvent addition alone. For example, a polymeric resin with a low acid value, such as at or below 200, can require pH adjustment, such as by addition of base, and also addition of one or more solvents, such as an alcohol.

4. Exemplary Methods

Provided herein are methods that include preparing a premix composition of one or more particles, such as pigments, one or more liquid carriers, such as water or an organic solvent, one or more dispersants, and optionally, one or more additives; agitating the premix composition in the presence of a solid milling agent that is substantially insoluble in the liquid carrier, such as a non-crosslinked polymeric resin, e.g., an alkali-soluble resin, an acid-soluble resin, or an organic solvent-soluble resin; and solubilizing the solid milling agent in the liquid carrier, such as by pH adjustment, e.g., addition of acid or base, or addition of one or more solvents, after particle size reduction is completed.

The following methods are exemplary only and provide a platform from which adjustments can be made. It is understood that changes can be made to the steps of the method while retaining some if not all of the desirable properties of the method. Further changes can be made by adding or altering steps or components of each step. For example, the order in which the steps are performed may be changed.

For example, the exemplary methods provided herein can utilize an alkali-soluble anionic solid polymeric resin as the milling media, e.g., an anionic styrene-acrylic polymer, and can solubilize the resin after particle dispersion, such as pigment dispersion, by pH adjustment, such as by addition of base, e.g., ammonia. For example, the methods provided herein can utilize an anionic styrene-acrylic polymer that can be solubilized after pigment dispersion by addition of ammonia to the composition.

Exemplary of the methods provided herein that utilize a solid polymeric milling media that can be solubilized in the composition after particle size reduction are those that utilize an acid-soluble cationic solid polymeric resin as the milling media, e.g., a cationic imide-based polymer, that can be solubilized after particle dispersion, such as pigment dispersion, by pH adjustment, such as by addition of acid, e.g., acetic acid. For example, the methods provided herein can utilize a cationic imide-based polymer that can be solubilized after pigment dispersion by addition of acetic acid to the composition.

Exemplary of the methods provided herein that utilize a solid polymeric milling media that can be solubilized in the composition after particle size reduction are those that utilize an alkali-soluble anionic solid polymeric resin as the milling media, e.g., a low acid value anionic styrene-acrylate polymer, that can be solubilized after particle dispersion, such as pigment dispersion, by pH adjustment, such as by addition of base, e.g., ammonia, and addition of a second solvent, such as an alcohol, e.g., n-propanol. For example, the methods provided herein can utilize an anionic styrene-acrylate polymer that can be solubilized after pigment dispersion by addition of ammonia and n-propanol to the composition.

The exemplary methods provided herein utilizing a solid polymeric milling media which can be solubilized in the composition after particle size reduction are those that utilize a solvent-soluble, such as an organic solvent-soluble, e.g., 3-methoxy-butanol, solid polymeric resin as the milling media. Such milling media include but are not limited to a vinyl chloride/vinyl acetate polymer, that can be solubilized after particle dispersion, such as pigment dispersion, by addition of a second solvent, such as a cyclic hydrocarbon, e.g., cyclohexanone. For example, the methods provided herein can utilize a vinyl chloride/vinyl acetate polymer that can be solubilized in 3-methoxy-butanol after pigment dispersion by addition of cyclohexanone to the composition.

C. Examples

The following examples, including experiments and results achieved, are provided for illustrative purposes only and are not to be construed as limiting the claimed subject matter.

Example 1

A series of ink compositions were prepared that utilized an anionic solid polymeric resin as the milling media. After particle size reduction of the pigment was completed (i.e. after agitation or milling), the resin, an anionic styrene-acrylic resin, was rendered soluble (dispersed) in the ink composition either by adjusting the pH of the solution with base or by pH adjustment and addition of a second solvent to the composition. A series of comparative ink compositions were also prepared that utilized either a ceramic milling media (0.7 mm) or glass milling media in place of the dispersible anionic solid polymer resin milling media. Properties such as color strength, gloss and particle size distribution of the ink compositions prepared using the dispersible solid polymeric milling media were measured and compared to the ink compositions prepared using ceramic or glass milling media. Unless otherwise stated, the comparative ink compositions used commercially available pigments milled according to industry standards.

A. Alkali-Soluble Anionic Solid Polymeric Resin Milling Media Solubilized by Ph Adjustment 1. Yellow Ink Compositions A series of yellow ink compositions were prepared that utilized an alkali-soluble anionic styrene-acrylic solid polymeric resin as the milling media. Yellow Inks 1-4 were prepared by combining either exterior grade Yellow Pigment 74 (Inks 1-3; Product No. 272-0723; Sun Chemical, Parsippany, N.J.) or interior grade Yellow Pigment 74 (Ink 4; Product No. 472-4497, Sun Chemical) with Triton X-100 surfactant (Dow, Midland, Mich.), anionic styrene-acrylic polymer Joncryl® 678 resin pellets (acid value=215; MW=8500; BASF, Florham Park, N.J.), DF-110D defoamer (Air Products, Allentown, Pa.) and water in a Silverson mixer (East Longmeadow, Mass.) Inks 1-3 also contained Proxel biocide (Arch Chemicals, Norwalk, Conn.). The compositions were either mixed for 2 hours (Inks 1 and 4) or 4 hours (Inks 2 and 3). The pH of the solution was then neutralized with ammonia, resulting in dispersion of the Joncryl® 678 resin in the composition. The formulations are shown below in Table 1.

Two comparative yellow inks (Inks 5 and 6) were prepared that also contained a styrene-acrylic resin. Rather than using the styrene-acrylic resin as the milling media, it was first neutralized with ammonia before it was added to the composition Inks 5 and 6 were prepared by mixing either exterior grade Yellow Pigment 74 (Ink 5; Product No. 272-0723; Sun Chemical) or interior grade Yellow Pigment 74 (Ink 6; Product No. 472-4497, Sun Chemical), neutralized styrene-acrylic polymer Joncryl® 678 resin (Ink 5) or Joncryl® 674 resin (Ink 6; acid value=217; MW=13,000; BASF), DF-110D defoamer (Air Products) and water in a Silverson mixer (East Longmeadow, Mass.) Ink 5 also contained Triton X-100 surfactant (Dow) and Proxel biocide (Arch Chemicals). The premix was completed in 30 minutes followed by milling on an Eiger Mini-Mill (Engineered Mills, Inc., Grayslake, Ill.) utilizing 0.7 mm ceramic milling media for either 6 minutes (Ink 5) or 12 minutes (Ink 6). The formulations are shown below in Table 1.

TABLE 1

Yellow ink composition formulations

| Material (wt %) | Anionic polymeric milling media | | | | Comparative Ceramic milling media | |
|---|---|---|---|---|---|---|
| | 1 | 2 | 3 | 4 | 5 | 6 |
| Pigment Yellow 74 | 33.0 | 33.0 | 33.0 | 33.33 | 33.0 | 35.0 |
| Triton X-100 | 4.2 | 4.2 | 4.2 | 4.17 | 4.2 | — |
| Joncryl resin pellets | 16.5 | 16.5 | 8.25 | 16.67 | 8.25 | 8.75 |
| DF-110D defoamer | 0.2 | 0.2 | 0.2 | 0.2 | 0.2 | 0.2 |
| Proxel biocide | 0.2 | 0.2 | 0.2 | — | 0.2 | 0.2 |
| Water | 45.9 | 45.9 | 54.15 | 45.63 | 54.15 | 55.85 |
| Total | 100.0 | 100.0 | 100.0 | 100.0 | 100.0 | 100.0 |

Another yellow ink composition that contained a dispersed styrene-acrylic resin solution in addition to the styrene acrylic resin used as the milling media was also prepared. Ink 7 was prepared by combining 620 g C.I. Pigment Yellow 14 presscake at 59.6% solids (Product No. 474-4480; Sun Chemical, Parsippany, N.J.) with 124 g Joncryl® 674 resin solution at 30% solids, 248 g Joncryl® 674 ground resin pellets, 2 g Proxel GXL biocide (Arch Chemicals, Norwalk, Conn.), 2 g DF-110D defoamer (Air Products, Allentown, Pa.) and 43.4 g Soprophor® S40/70 surfactant (Rhodia). The composition was mixed under a Hockmeyer mixer using a Cowles blade at 6600 RPM for a total of 15 hours and then neutralized by adding a 95 g of a 28% solution of ammonia to yield the yellow ink composition.

A commercial Yellow 14 dispersion, consisting of 29.0% pigment Yellow 14, 45.7% Joncryl® 674 resin (30% resin solids, neutralized with ammonia), 0.2% Proxel GXL biocide, 0.2% DF-110D defoamer and 25.3% water, was used as a comparative yellow ink (Ink 8). Ink 8 was milled on a Premier® mill using 1.0 mm glass milling media instead of the styrene-acrylic solid polymeric resin milling media.

The color strength of Inks 1-8 was measured by a Datacolor 600® spectrophotometer (Lawrenceville, N.J.) after tinting in a Porter® Paint base (Pittsburgh, Pa.) using a 50:1 ratio of paint base:ink. For the tinting, 50 grams of white paint was measured into a cup. To that white paint, 1.0 gram of the ink composition was added. Mixing was then performed with a metal spatula until the color in the cup was homogeneous. Generally, this required about 50 turns of the spatula in about one to two minutes. The ink compositions were then 'drawn down' side-by-side on a Leneta card (Leneta Company, Inc., Mahwah, N.J.) with a #30 Mayer Rod and dried by an air dryer. The dried tint was then measured on a spectrophotometer with "batch" (Inks 1-4 and 7) versus "standard" (Inks 5-6 and 8, respectively). The light emitted from the spectrophotometer on the drawdown and the reflectance curve was measured. The color strength is a comparative measure of the reflectance at maximum absorption of "batch" versus "standard." Inks 1-4 exhibited similar or higher comparative color strengths values to Comparative Inks 5 and 6 Inks 1, 2 and 3 attained 101.64%, 101.34% and 100.71% strength, respectively, relative to comparative Ink 5. Ink 4 demonstrated 98.98% strength relative to comparative Ink 6 Ink 7 demonstrated 112% strength relative to Comparative Ink 8

The mean particle size distribution at D50 was measured for each ink composition. Mean particle size was determined using a Nanotrac Particle Size Analyzer (Microtrac, Montgomeryville, Pa.). The results are shown in Table 2 below.

The gloss of Inks 1-4 was measured and compared to the gloss values of comparative Inks 5 and 6. Gloss measurements were obtained using a 60° glossmeter (BYK Gardner, Columbia, Md.).

TABLE 2

Properties of yellow ink compositions

| Property | Anionic polymeric milling media | | | | | Comparative Ceramic milling media | | Comparative Glass milling media |
|---|---|---|---|---|---|---|---|---|
| | 1 | 2 | 3 | 4 | 7 | 5 | 6 | 8 |
| Gloss 60° | 44.6 | 45.3 | 33.3 | 40.1 | — | 31.8 | 41.2 | — |
| D50 mean particle size (nm) | 347.0 | 354.0 | 347.0 | 157.4 | 163.0 | 316.0 | 248.7 | 170.0 |

Inks 1-4 demonstrated gloss values and mean particle size dimensions comparable to or exceeding those of Inks 5 and 6, prepared using ceramic milling media Ink 7 was able to achieve a smaller D50 mean particle size distribution than the ink composition that was prepared using glass milling media (Ink 8). These results illustrate that it was possible to prepare inks utilizing an anionic polymeric milling media that was solubilized after milling that exhibited color strength, gloss and mean particle size values comparable to or superior to inks prepared using ceramic or glass milling media.

2. Black Ink Compositions

A black ink composition (Ink 9) was prepared by combining Regal® 660 Pigment Black 7 (Cabot Corporation, Boston, Mass.) with Triton X-100 surfactant (Dow, Midland, Mich.), anionic styrene-acrylic polymer Joncryl® 678 resin pellets (acid value=215; MW=8500; BASF, Florham Park, N.J.), DF-110D defoamer (Air Products, Allentown, Pa.) and water in a Silverson mixer (East Longmeadow, Mass.). The composition was mixed for 2 hours and then the pH was neutralized with ammonia, resulting in dispersion of Joncryl® 678 resin in the composition. The formulation is shown below in Table 3.

A comparative black ink (Ink 10) was prepared that also utilized a styrene-acrylic resin. Rather than using the anionic resin as the milling media, it was first neutralized with ammonia before adding to the composition Ink 10 was prepared by mixing Regal® 660 Pigment Black 7 (Cabot Corporation), neutralized styrene-acrylic polymer Joncryl® 674 resin (acid value=217; MW=13,000; BASF), DF-110D defoamer (Air Products), Proxel biocide (Arch Chemicals) and water in a Silverson mixer (East Longmeadow, Mass.). The premix was completed in 30 minutes followed by milling on the Eiger Mini-Mill (Engineered Mills, Inc., Grayslake, Ill.) utilizing 0.7 mm ceramic media for 12 minutes. The formulation is shown below in Table 3.

TABLE 3

Black ink composition formulations

| Material (wt %) | Anionic polymeric milling media 9 | Comparative Ceramic milling media 10 |
|---|---|---|
| Pigment Black 7 | 33.33 | 45.0 |
| Triton X-100 | 4.17 | 2.8 |
| Joncryl resin pellets | 16.67 | 3.5 |

TABLE 3-continued

Black ink composition formulations

| Material (wt %) | Anionic polymeric milling media 9 | Comparative Ceramic milling media 10 |
|---|---|---|
| DF-110D defoamer | — | 0.2 |
| Proxel biocide | 0.2 | 0.2 |
| Water | 45.63 | 48.3 |
| Total | 100.00 | 100.0 |

The color strength of Inks 9 and 10 was measured by a Datacolor 600® spectrophotometer (Lawrenceville, N.J.) after tinting in a Porter® Paint base (Pittsburgh, Pa.) using a 50:1 ratio of paint base:ink according to the method described above. Ink 9 demonstrated a color strength of 94.88% relative to Ink 10. The gloss and mean particle size (D50) of Ink 9 was measured and compared to the gloss and mean particle size value of Comparative Ink 10. Gloss measurements were obtained using a 60° glossmeter (BYK Gardner, Columbia, Md.). Mean particle size was determined using a Nanotrac Particle Size Analyzer (Microtrac, Montgomeryville, Pa.). The optical density of Inks 9 and 10 was measured on uncoated Leneta paper by making a hand drawdown using a #3 Mayer rod and measuring with a BYK Gardner Densitometer. The results are shown in Table 4 below.

TABLE 4

Properties of black inks

| Material | Anionic polymeric milling media 9 | Ceramic milling media 18 |
|---|---|---|
| Gloss 60° | 31.0 | 24.9 |
| D50 mean particle size (nm) | 121.7 | 105.3 |
| Optical density | 1.40 | 1.23 |

Ink 9 exhibited a higher gloss value and mean particle size dimension to Comparative Ink 10. The optical density of Ink 9 was comparable to Ink 10. These results demonstrate that it was possible to prepare a black ink utilizing an anionic polymeric milling media that was solubilized after milling that exhibited color strength, gloss and mean particle size values that exceeded those of a black ink prepared using ceramic milling media.

3. Blue Ink Compositions

Three blue ink compositions were prepared that utilized an anionic styrene-acrylic solid resin as the milling media before dispersion in the composition Inks 11 and 12 were prepared by combining Pigment Blue 15:3 (Product No. 249-9813; Sun Chemical, Parsippany, N.J.) with Triton X-100 surfactant (Dow, Midland, Mich.), either anionic styrene-acrylic polymer Joncryl® 678 resin pellets (Ink 11; acid value=215; MW=8500; BASF, Florham Park, N.J.) or Joncryl® HPD-96 resin pellets (Ink 12; acid value=220; MW=16,000; BASF), DF-110D defoamer (Air Products, Allentown, Pa.) and water in a Silverson mixer (East Longmeadow, Mass.). A blue synergist, polyalkoxy CuPc sulfonamide (Sun Chemical), was also added to Ink 12 to provide higher stability to flocculation or particle size growth relative to not using it. The compositions were mixed for 20 hours and then the pH was neutralized with ammonia to cause the dispersion of the Joncryl® 678 or Joncryl® HPD-96 resins. The formulations are shown below in Table 5.

Ink 13 (not shown in the table) utilized anionic styrene-acrylic polymer Joncryl® 690 resin pellets (acid value=240; MW=16,500; BASF, Florham Park, N.J.) that were ground in an Oster blender (osterized) before adding to the composition Ink 13 was prepared by adding 30.0 g C.I. Pigment Blue 15:3 (Product No. 249-1284; Sun Chemical, Parsippany, N.J.), 6.0 g Zephrym SD-1121 dispersant (Croda Inc., Edison, N.J.), 0.4 g DF-110D defoamer (Air Products, Allentown, Pa.) and 63.6 g deionized water to 40.0 g of the osterized Joncryl® 690 resin. The composition was mixed in a Silverson mixer (East Longmeadow, Mass.) at 4400 RPM for 9 hours.

Two comparative blue inks (Ink 14 and 15) were prepared that also utilized a styrene-acrylic resin. Rather than using the anionic resin as the milling media, it was first neutralized with ammonia before adding to the composition. Comparative Ink 14 was prepared by mixing Pigment Blue 15:3 (Sun Chemical), neutralized Joncryl® 674 resin (acid value=217; MW=13,000; BASF), Proxel biocide (Arch Chemicals) and water in a Silverson mixer (East Longmeadow, Mass.). The premix was completed in 30 minutes followed by milling on the Eiger Mini-Mill (Engineered Mills, Inc., Grayslake, Ill.) utilizing 0.7 mm ceramic milling media for 18 minutes. The formulation of Comparative Ink 14 is shown below in Table 5.

Comparative ink 15 was prepared using the same materials and amounts of Ink 13 as described above. Comparative Ink 15 was milled on a Netzsch Lab Star® Mill using ceramic milling media.

TABLE 5

Blue ink composition formulations

| Material (g) | Anionic polymeric milling media | | Comparative Ceramic milling media |
|---|---|---|---|
| | 11 | 12 | 14 |
| Pigment Blue 15:3 | 33.33 | 30.12 | 35.0 |
| Triton X-100 | 4.17 | 3.81 | — |
| Polymeric resin | 16.67 | 15.06 | 8.75 |
| DF-110D defoamer | 0.2 | 0.1 | — |
| Proxel biocide | — | — | 0.2 |
| CuPc sulfonamide | — | 4.56 | — |
| Water | 45.63 | 46.35 | 56.05 |
| Total | 100.0 | 100.0 | 100.0 |

The color strength of Inks 11-15 was measured by a Datacolor 600® spectrophotometer (Lawrenceville, N.J.) after tinting in a Porter® Paint base (Pittsburgh, Pa.) using a 50:1 ratio of paint base:ink according to the method described above Inks 11 and 12 demonstrated a color strength of 109.18% and 102.66%, respectively, relative to Comparative Ink 14. The gloss and mean particle size (D50) of Inks 11 and 12 were measured and compared to the gloss and mean particle size value of Comparative Ink 14. The mean particle size of Ink 13 was measured and compared to Comparative Ink 15. Gloss measurements were obtained using a 60° glossmeter (BYK Gardner, Columbia, Md.). Mean particle size was determined using a Nanotrac Particle Size Analyzer (Microtrac, Montgomeryville, Pa.). The results are shown in Table 6 below.

TABLE 6

Properties of blue inks

| | Anionic polymeric milling media | | | Comparative Ceramic milling media | |
|---|---|---|---|---|---|
| | 11 | 12 | 13 | 14 | 15 |
| Gloss 60° | 50.0 | 55.0 | — | 34.1 | — |
| Mean particle size (nm) | 148.0 | 194.0 | 105.6 | 259.0 | 161.0 |

Inks 11 and 12 both exhibited higher gloss values and were able to achieve smaller mean particle size dispersions in comparison to Comparative Ink 14, which was prepared using ceramic milling media Ink 13 was also able to achieve a smaller particle size dimension that Comparative Ink 15, made from the same components, but milled with ceramic media. The results show that it was possible to prepare blue inks from a milling media that was solubilized after milling that were able to exhibit higher gloss and smaller mean particle sizes compared to blue inks prepared using ceramic milling media.

4. Violet Ink Compositions

Two violet ink compositions were prepared that utilized an anionic styrene-acrylic solid resin as the milling media before dispersion in the composition Inks 16 and 17 were prepared by combining C.I. Pigment Violet 23 (Product No. 246-1671; Sun Chemical, Parsippany, N.J.) with osterized Joncryl® 690 acrylic resin pellets (acid value=240; MW=16,500; BASF, Florham Park, N.J.), Igepal® CA-887 surfactant (Rhodia, New Brunswick, N.J.), DF-110D defoamer (Air Products, Allentown, Pa.), Proxel GXL biocide (Arch Chemicals, Norwalk, Conn.) and water. The compositions were mixed in a Silverson mixer (East Longmeadow, Mass.) at 4400 RPM and then the pH was neutralized with ammonia to cause the dispersion of the Joncryl® 690 resin. The formulations are shown below in Table 7.

TABLE 7

Violet pigment dispersion compositions

| | Anionic polymeric milling media | |
|---|---|---|
| Material (g) | 16 | 17 |
| Pigment Violet 23 | 40.0 | 48.0 |
| Joncryl ® 690 acrylic resin | 40.0 | 24.0 |
| Igepal ® CA-887 surfactant | 10.0 | 12.0 |
| Proxel GXL biocide | 0.2 | 0.2 |
| DF-110D defoamer | 0.3 | 0.4 |
| Water | 49.5 | 59.4 |

A third violet ink composition (Ink 18) that utilized an anionic styrene acrylic solid resin as the milling media before dispersion in the composition was also prepared. This ink composition contained a slurry of water and styrene acrylic resin in addition to the styrene acrylic resin used as the milling media. The slurry was prepared by mixing 50.6 g Joncryl® 674 acrylic resin pellets (acid value=217; MW=13,000; BASF) and 187.4 g water under a rotor/stator mixer to reduce the resin pellets to ~40 μm. 126.5 g of C.I. Pigment Violet 23 (Sun Chemical), 42.0 g Joncryl® 674 resin solution at 30% solids (BASF), 7.9 g HLD-11 dispersing additive at 40% solids (Keim Additec, Kirchberg, Germany), 0.3 g Proxel GXL biocide (Arch Chemicals) and 0.3 g DF-110D defoamer (Air Products) were then added to the slurry and mixed with a Silverson mixer at 4400 RPM. The pH of the solution was then neutralized with ammonia to cause the dispersion of the Joncryl® 674 acrylic resin pellets (used as the milling media) in the final ink dispersion.

A commercial violet ink composition (Ink 20) was used as a comparative example to Inks 16-18. Comparative Ink 20 also contained a styrene-acrylic resin, but it was neutralized with ammonia before it was added to the composition. Comparative Ink 20 contained 38% C.I. Pigment Violet 23 (Product No. 246-1671; Sun Chemical), 9.5% neutralized Joncryl® 674 resin solution (30% resin solids) (BASF), 0.2% Proxel biocide (Arch Chemicals), 0.3% DF-110D defoamer (Air Products), and 52.1% water. The composition was milled on a Premier® Mill with 1.0 mm glass milling media instead of the solid polymeric resin.

Another violet ink composition that contained a dispersed styrene-acrylic resin solution in addition to the styrene acrylic resin used as the milling media was also prepared. Ink 19 was prepared by combining 48.6 g C.I. Pigment Violet 3 (Product No. Z99CN0904; Sanhu Color Company, China) with 16.2 g Joncryl® 674 resin solution at 30% solids, 10.0 g Joncryl® 674 ground resin pellets, 4.2 g Triton® X-100 surfactant (Dow), 0.3 g Proxel GXL biocide (Arch Chemicals, Norwalk, Conn.), 0.3 g DF-110D defoamer (Air Products, Allentown, Pa.) and 70.4 g water. The composition was mixed under a Silverson mixer at 4400 RPM for a total of 12 hours and then neutralized by adding a 12.0 g of a 28% solution of ammonia to yield the violet ink composition (Ink 19).

A comparative violet ink (Ink 21) was prepared that used the same components as Ink 19, but the Joncryl® 674 resin was neutralized with ammonia before the resin was added to the composition. After all of the materials were added to the composition, the composition was milled on a Premier® mill using 1.0 mm glass milling media instead of the styrene-acrylic solid polymeric resin milling media.

The mean particle size distribution at D50 was measured for each ink composition that used the styrene-acrylic resin milling media (Inks 16-19). The mean particle size distribution (D50) of the comparative violet pigment dispersions milled with glass milling media was also measured (Comparative Inks 20-21). Mean particle size was determined using a Nanotrac Particle Size Analyzer (Microtrac, Montgomeryville, Pa.). The results are shown below in Table 8.

Inks 16-18 were all able to achieve much smaller D50 particle size dimensions than the comparative composition, Ink 20 Ink 19 was also able to achieve a smaller D50 particle size dimension than comparative Ink 21. The results show that it was possible to prepare violet inks from a milling media that was solubilized after milling that were able to achieve smaller mean particle sizes compared to violet inks milled with glass milling media.

The color strength of Ink 19 and Comparative Ink 21 was measured by a Datacolor 600® spectrophotometer (Lawrenceville, N.J.) after tinting in a Porter® Paint base (Pittsburgh, Pa.) using a 50:1 ratio of paint base:ink according to the method described above. The results show that the violet ink composition prepared with the polymeric milling media (Ink 19) was able to obtain a 104% color strength in comparison to Comparative Ink 21, prepared using glass milling media.

5. Red Ink Compositions

Three red ink compositions that that utilized an anionic styrene-acrylic solid resin as the milling media before dispersion in the composition were prepared. The inks also contained a dispersed styrene-acrylic resin solution in addition to the styrene acrylic resin used as the milling media. Inks 22-24 were prepared by combining either C.I. Pigment Red 57:1 (Inks 22 and 23; Product No. 57DT819; CDR Pigments & Dispersions, Elizabethtown, Ky.) or C.I. Pigment Red 49:2 presscake at 70.2% solids (Ink 24; Product No. 411-4432, Sun Chemical, Parsippany, N.J.) with Joncryl® 674 resin solution at 30% solids (acid value=217; MW=13,000; BASF), 30.0 g Joncryl® 674 ground resin pellets, Proxel GXL biocide (Arch Chemicals, Norwalk, Conn.), DF-110D defoamer (Air Products, Allentown, Pa.) and water. The compositions were mixed under a Silverson mixer at 4400 RPM for a total of 12 hours and then neutralized by adding a 28% solution of ammonia to yield the ink dispersions. The formulations are shown below in Table 9.

Three comparative red inks, Comparative Inks 25-27, were prepared that used the same components as Inks 22-24, respectively, but the Joncryl® 674 resin was neutralized with ammonia before the resin was added to the composition. After all of the materials were added to the compositions, the compositions were milled on a Premier® mill

TABLE 8

Mean particle size distribution values (D50) of violet pigment dispersions

| | Anionic polymeric milling media | | | | Comparative Glass milling media | |
|---|---|---|---|---|---|---|
| Mill time (hr) | 16 | 17 | 18 | 19 | 20 | 21 |
| 1 | 92.4 nm | 105.2 nm | — | — | — | — |
| 1.5 | — | — | 116.2 nm | — | — | — |
| 2 | 83.6 nm | — | — | — | — | — |
| 3 | — | 89.2 nm | — | — | — | — |
| 3.5 | 76.1 nm | — | — | — | — | — |
| 4 | — | 85.5 nm | — | — | — | — |
| 11 | — | — | 107.4 nm | — | — | — |
| Final D50 value | 76.1 nm | 85.5 nm | 107.4 nm | 150.0 nm | 146.0 nm | 163.0 nm | using 1.0 mm glass milling media instead of the anionic styrene-acrylic solid polymeric resin milling media. The formulations are shown below in Table 9.

TABLE 9

Red ink composition formulations

| Material (g) | Anionic polymeric milling media | | | Comparative Glass milling media | | |
|---|---|---|---|---|---|---|
| | 22 | 23 | 24 | 25 | 26 | 27 |
| Pigment Red | 45.0 | 52.5 | 105.3 | 45.0 | 52.5 | 105.3 |
| 30% Joncryl resin solution | 30.0 | 17.5 | 14.0 | 30.0 | 17.5 | 14.0 |
| Joncryl resin pellets (ground) | 30.0 | 14.7 | 20.7 | 30.0 | 14.7 | 20.7 |
| DF-110D defoamer | 0.2 | 0.2 | 0.3 | 0.2 | 0.2 | 0.3 |
| Proxel biocide | 0.2 | 0.2 | 0.3 | 0.2 | 0.2 | 0.3 |
| Water | 44.6 | 64.9 | 9.3 | 44.6 | 64.9 | 9.3 |
| Ammonia (28% solution) | 12.0 | 4.5 | 4.0 | 12.0 | 4.5 | 4.0 |

The color strength of Inks 22-27 was measured by a Datacolor 600® spectrophotometer (Lawrenceville, N.J.) after tinting in a Porter® Paint base (Pittsburgh, Pa.) using a 50:1 ratio of paint base:ink according to the method described above. Red Inks 22-24 demonstrated color strengths of 112%, 106% and 112%, respectively, relative to comparative red Comparative Inks 25-27, respectively. These results indicate that inks prepared using the styrene-acrylic polymeric milling media have higher color strength relative to the comparative red ink compositions prepared using glass milling media.

The mean particle size distribution at D50 was measured at several time points for each ink composition that used the polymeric milling media (Inks 22-24) and was compared to the mean particle size distribution (D50) of the comparative red ink compositions that used glass milling media (Comparative Inks 25-27, respectively). Mean particle size was determined using a Nanotrac Particle Size Analyzer (Microtrac, Montgomeryville, Pa.). The results, shown in Table 10 below, demonstrated that the ink compositions prepared with the polymeric milling media were able to achieve a smaller D50 mean particle size distribution than the ink compositions that were prepared using glass milling media.

TABLE 10

Mean particle size distribution values (D50) of red ink compositions after various mill times

| Mill time (hr) | Anionic polymeric milling media | | | Comparative Glass milling media | | |
|---|---|---|---|---|---|---|
| | 22 | 23 | 24 | 25 | 26 | 27 |
| 1 | 180.0 nm | 149.0 nm | 295.0 nm | — | — | — |
| 3 | 155.0 nm | 141.0 nm | 246.0 nm | — | — | — |
| 12 | 142.0 nm | 129.0 nm | 233.0 nm | — | — | — |
| Final D50 value | 142.0 nm | 129.0 nm | 233.0 nm | 207.0 nm | 193.0 nm | 287.0 nm |

B. Anionic Solid Polymeric Resin Milling Media Solubilized by Ph Adjustment and Addition of a Second Solvent A red ink composition was prepared that utilized an anionic solid polymeric resin milling media that was rendered soluble in the dispersion after completion of pigment particle size reduction. The polymeric milling media that was used was a low acid resin (Joncryl® 586 resin; acid value=108; MW=4600) that could not be solubilized by pH adjustment alone. A combination of pH adjustment and addition of a second solvent was used to solubilize the solid milling media after pigment particle size reduction was completed.

Red Ink 28 was prepared by combining 52.5 g of C.I. Pigment Red 57:1 (Product No. 57DT819; CDR) with 17.5 g Joncryl® 674 resin solution at 30% solids (acid value=217; MW=13,000; BASF), 14.7 g Joncryl® 586 ground resin pellets, 0.2 g Proxel GXL biocide (Arch Chemicals, Norwalk, Conn.), 0.2 g DF-110D defoamer (Air Products, Allentown, Pa.) and 64.9 g water. The composition was mixed under a Silverson mixer at 4400 RPM for a total of 12 hours. The Joncryl® 586 resin was then neutralized and dispersed in the final composition by adding 2.2 g of a 28% solution of ammonia and 7.5 g of n-propanol.

A commercial Red 57:1 dispersion, consisting of 28.7% pigment Red 57:1, 36.4% Joncryl® resin solution (30% resin solids, neutralized with ammonia), 0.2% Proxel GXL biocide, 0.2% DF-110D defoamer and 34.5% water, was used as a Comparative red ink (Ink 29). Comparative Ink 29 was milled on a Premier® mill using 1.0 mm glass milling media instead of the styrene-acrylic solid polymeric resin milling media.

The color strength of Red Ink 28 and 29 was measured by a Datacolor 600® spectrophotometer (Lawrenceville, N.J.) after tinting in a Porter® Paint base (Pittsburgh, Pa.) using a 50:1 ratio of paint base:ink according to the method described above. Red Ink 28 demonstrated a color strength of 100% relative to Comparative red Ink 29, indicating that inks prepared using the styrene-acrylic polymeric milling media have comparable color strength relative to the comparative red ink compositions prepared using glass milling media.

The mean particle size distribution at D50 was measured at several time points for Ink 28 and was compared to the mean particle size distribution (D50) of Comparative red Ink 29 that used glass milling media. Mean particle size was determined using a Nanotrac Particle Size Analyzer (Microtrac, Montgomeryville, Pa.) Ink 28 had mean particle sizes (D50) of 144.0 nm after 1 hour, 134.0 nm after 3 hours, and 128.0 nm after 12 hours. In comparison, Ink 29 had a D50 value of 193.0 nm. These results demonstrate that the ink composition prepared with the polymeric milling media was able to achieve a smaller D50 mean particle size distribution than the ink composition that was prepared using glass milling media.

Example 2

An ink composition was prepared that utilized a cationic solid polymeric resin as the milling media. After particle size reduction of the pigment was completed (i.e. after agitation or milling), the resin, a cationic imide-based resin, was rendered soluble (dispersed) in the ink composition by adjusting the pH of the solution with acid. A comparative ink composition was also prepared that utilized glass milling media in place of the dispersible cationic solid polymeric resin milling media. Properties such as color strength and particle size distribution were measured and compared.

Yellow Ink 30 was prepared by combining 95.5 of C.I. Pigment Yellow 14 presscake (44% solids; Product No. 474-4480; Sun Chemical) with 13.8 g SMA® 20001 Imide Resin solution at 30.5% solids (neutralized in water by acetic acid; MW=~5000; Cray Valley, Exton, Pa.), 17.0 grams of SMA® 20001 Imide Resin ground resin pellets, 0.2 g DF-110D defoamer (Air Products, Allentown, Pa.) and 10.6 g water. The composition was mixed under a Silverson mixer at 4400 RPM for a total of 13 hours. The 20001 Imide Resin was then neutralized and dispersed in the final composition by adding 3.5 g of acetic acid.

A commercial Yellow 14 dispersion, consisting of 29.0% pigment Yellow 14, 45.7% Joncryl® resin solution (30% resin solids, neutralized with ammonia), 0.2% Proxel GXL biocide, 0.2% DF-110D defoamer and 25.2% water, was used as a comparative red ink (Ink 31). Comparative Ink 31 was milled on a Premier® mill using 1.0 mm glass milling media instead of the solid imide resin milling media.

The color strength of Inks 30 and 31 was measured by a Datacolor 600® spectrophotometer (Lawrenceville, N.J.) after tinting in a Porter® Paint base (Pittsburgh, Pa.) using a 50:1 ratio of paint base:ink according to the method described above. Yellow Ink 30 demonstrated a color strength of 109% relative to Comparative yellow Ink 31, indicating that inks prepared using the solid imide milling media have comparable color strength relative to the comparative yellow ink composition prepared using glass milling media.

The mean particle size distribution at D50 was measured for Ink 30 and was compared to the mean particle size distribution (D50) of comparative yellow Ink 31 that used glass milling media. Mean particle size was determined using a Nanotrac Particle Size Analyzer (Microtrac, Montgomeryville, Pa.) Ink 30 had a mean particle size (D50) of 170 nm after 13 hours, compared to a mean particle size (D50) of 170.0 nm for Comparative Ink 31. These results demonstrate that the ink composition prepared with the imide milling media was able to achieve a smaller D50 mean particle size distribution than the ink composition that was prepared using glass milling media.

Example 3

An ink composition was prepared that utilized a vinyl chloride/vinyl acetate copolymer resin as the milling media. After particle size reduction of the pigment was completed (i.e. after agitation or milling), the resin was rendered soluble (dispersed) in the ink composition by adding a second solvent to the composition that was able to dissolve and disperse the copolymer.

Ink 32 was prepared by combining 45.0 g C. I. Pigment Blue 15:4 (Product No. 249-1539; Sun Chemical) with 75.0 g 3-methoxy-butanol, 15.0 g Solsperse® 39000 (Lubrizol), and 30.0 g 85% vinyl chloride/15% vinyl acetate copolymer Vinnol® H15/50 ground resin (MW=60,000-80,000; Wacker, Calvert City, Ky.). Mixing was performed under a Silverson mixer at 4400 RPM. Solubilization of resin was then performed by adding 70.0 g cyclohexanone in order to yield a pigment particle dispersion.

The resulting particle size (d50) was 255 nm. The mean particle size distribution at D50 was measured for Ink 32 using a Nanotrac Particle Size Analyzer (Microtrac, Montgomeryville, Pa.). Ink 32 had a mean particle size (D50) of 255 nm, demonstrating that submicron particle size dispersion can be achieved by using a vinyl chloride/vinyl acetate copolymer resin as the milling media.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for preparing an in-situ, pigment particle dispersion comprising:
   providing a premix composition including one or more pigments, one or more dispersants, and a liquid carrier;
   milling said premix composition in the presence of a polymeric solid milling agent to a predetermined particle size;
   wherein said polymeric solid milling agent is non-functionalized or non-neutralized so as to render it substantially insoluble in said liquid carrier during the milling step; and then
   solubilizing said solid milling agent in said liquid carrier.

2. The method according to claim 1, wherein said solubilizing said solid milling agent is carried out after obtaining said predetermined particle size.

3. The method according to claim 1, wherein said solubilizing said solid milling agent is carried out by neutralizing via pH adjustment.

4. The method according to claim 3, wherein said pH adjustment is addition of an acid.

5. The method according to claim 3, wherein pH adjustment is addition of a base.

6. The method according to claim 4, wherein said acid is selected from acetic acid, lactic acid, phosphoric acid, hydrochloric acid, or combinations thereof.

7. The method according to claim 5, wherein said base is selected from ammonia, monoethylamine, triethylamine, sodium hydroxide, potassium hydroxide, or combinations thereof.

8. The method according to claim 1, wherein said solubilizing said solid milling agent is carried out by adding one or more additional solvents to said premix composition.

9. The method according to claim 1, wherein said solubilizing said solid milling agent is carried out by neutralizing via pH adjustment in combination with adding one or more additional solvents to said premix composition.

10. The method according to claim 8, wherein said one or more additional solvents is an organic solvent.

11. The method according to claim 1, wherein said solid milling agent comprises polymeric materials.

12. The method according to claim 11, wherein said polymeric materials are selected from acrylates, methacrylates, styrene-acrylates, imides, acrylic resins, phenoxy resins, ketone resins, aldehyde resins, epoxy resins, vinyl chloride resins, cellulose acetate resins, polyester resins, or combinations thereof.

13. The pigment particle dispersion produced by the method of claim 1, wherein the pigment particle dispersion is substantially free of non-soluble milling agents.

14. The pigment particle dispersion according to claim 13, prepared in the absence of any milling agent separating mechanisms.

* * * * *